Dec. 10, 1957 P. J. PAPADAKOS 2,815,820
POWER FOLDING ROTOR BLADE SYSTEM FOR ROTARY WING AIRCRAFT
Filed April 19, 1955 10 Sheets-Sheet 8

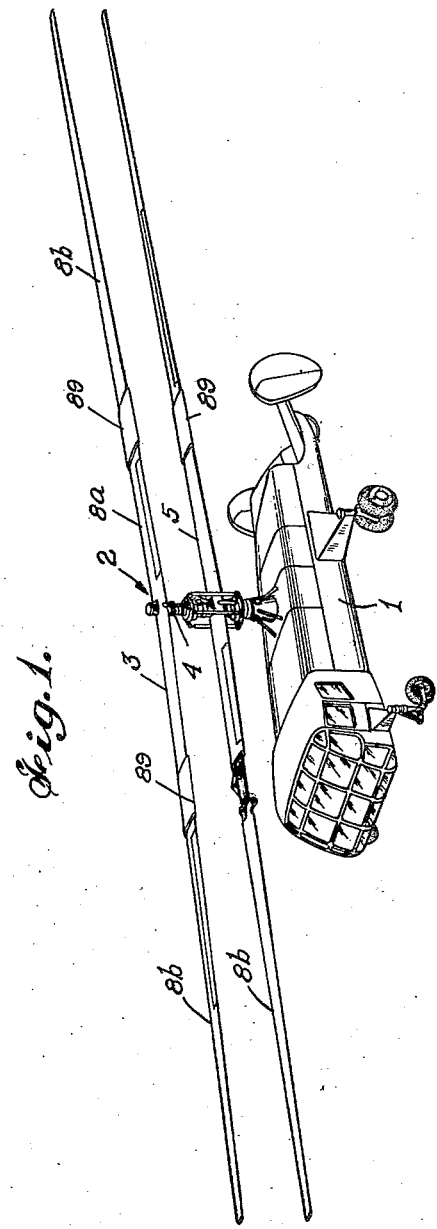

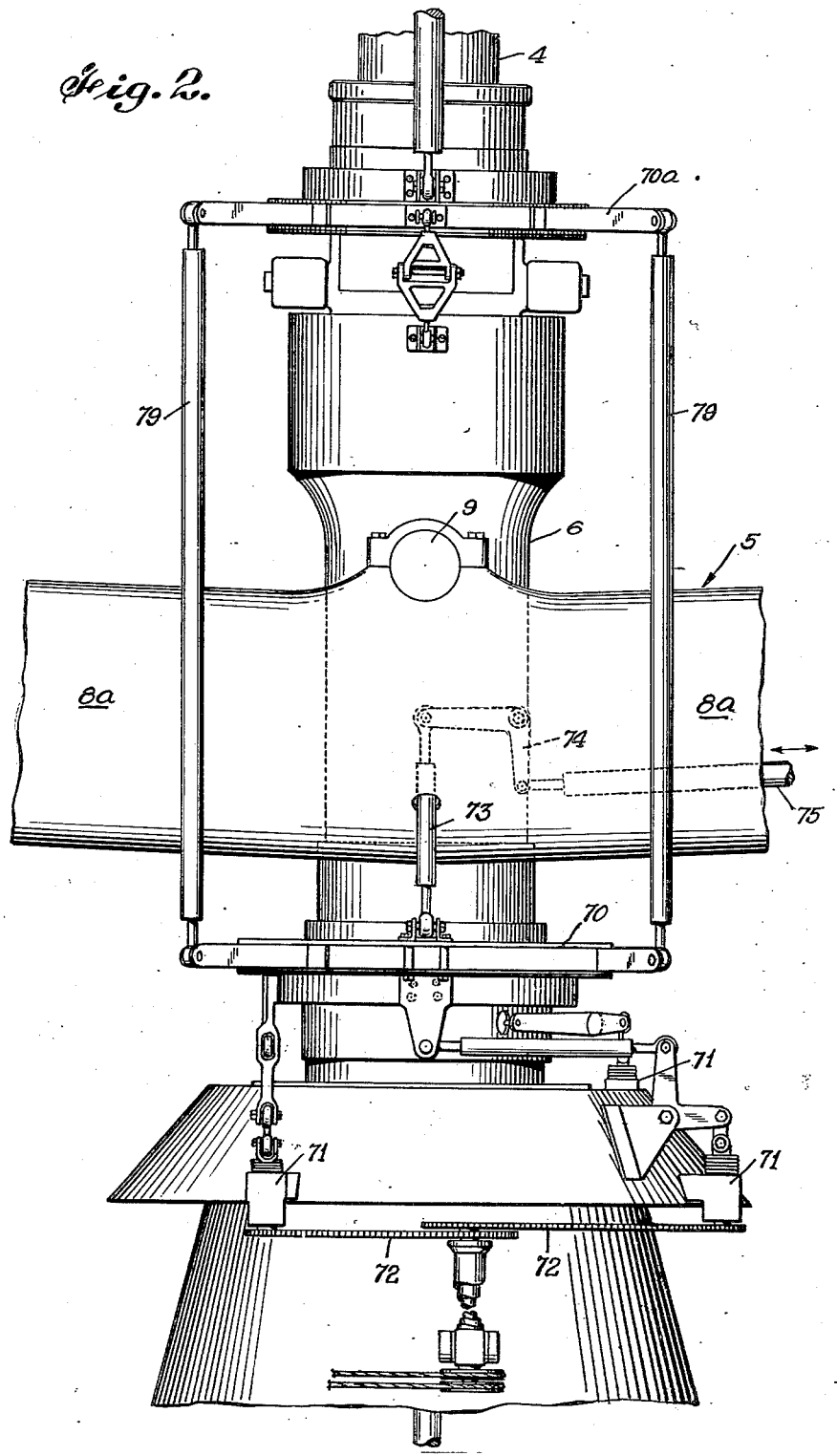

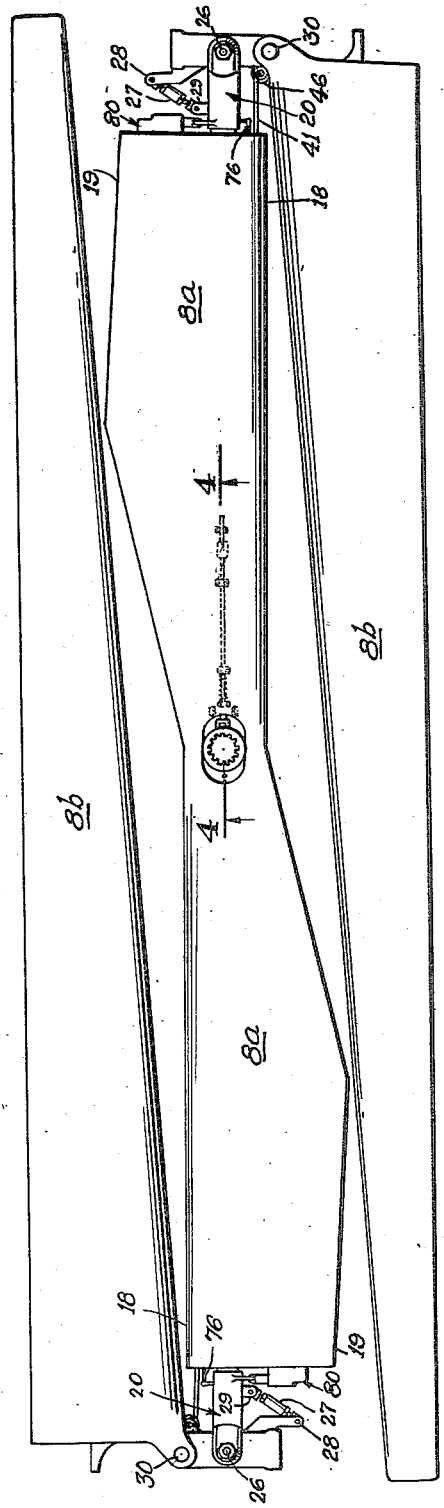

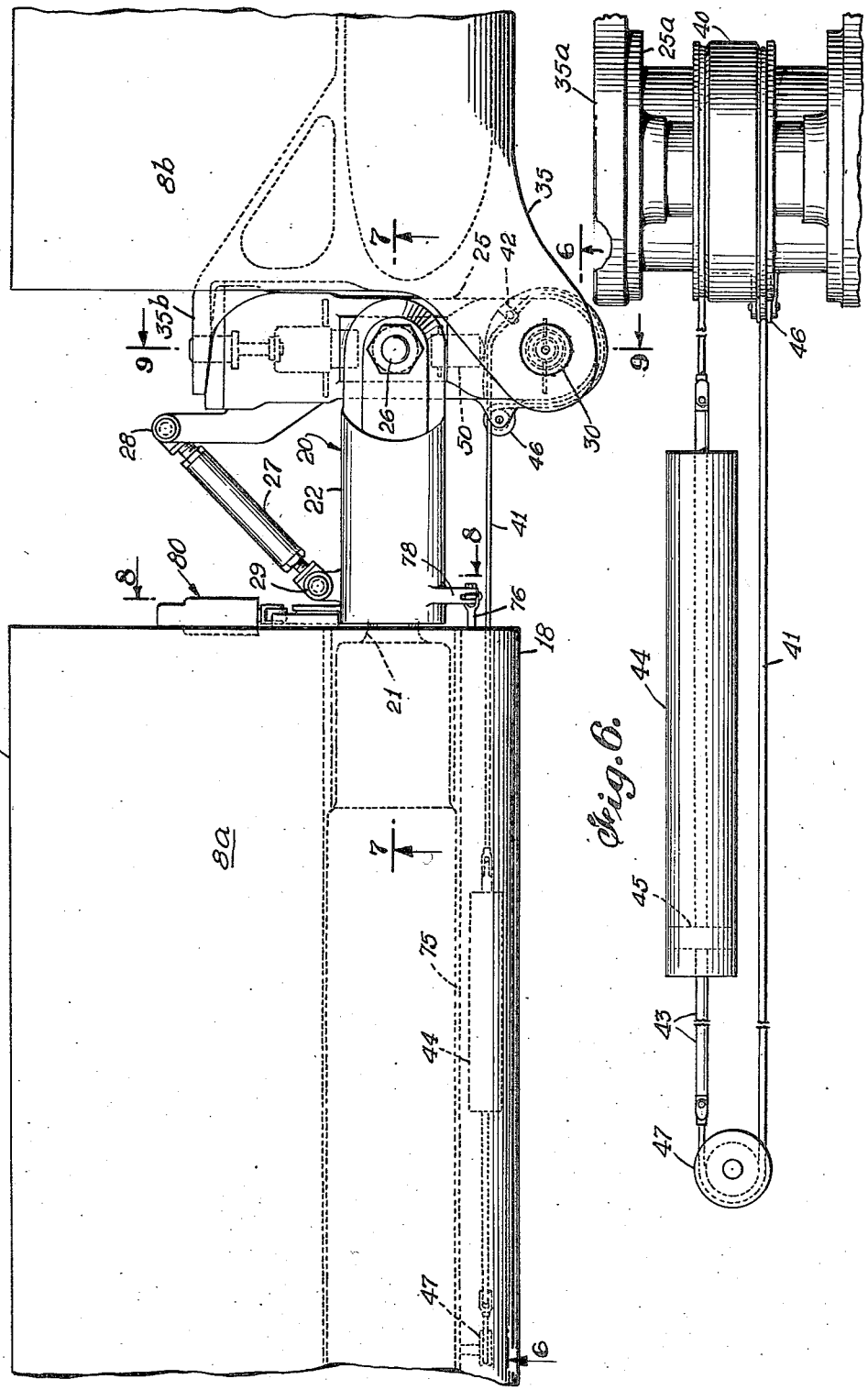

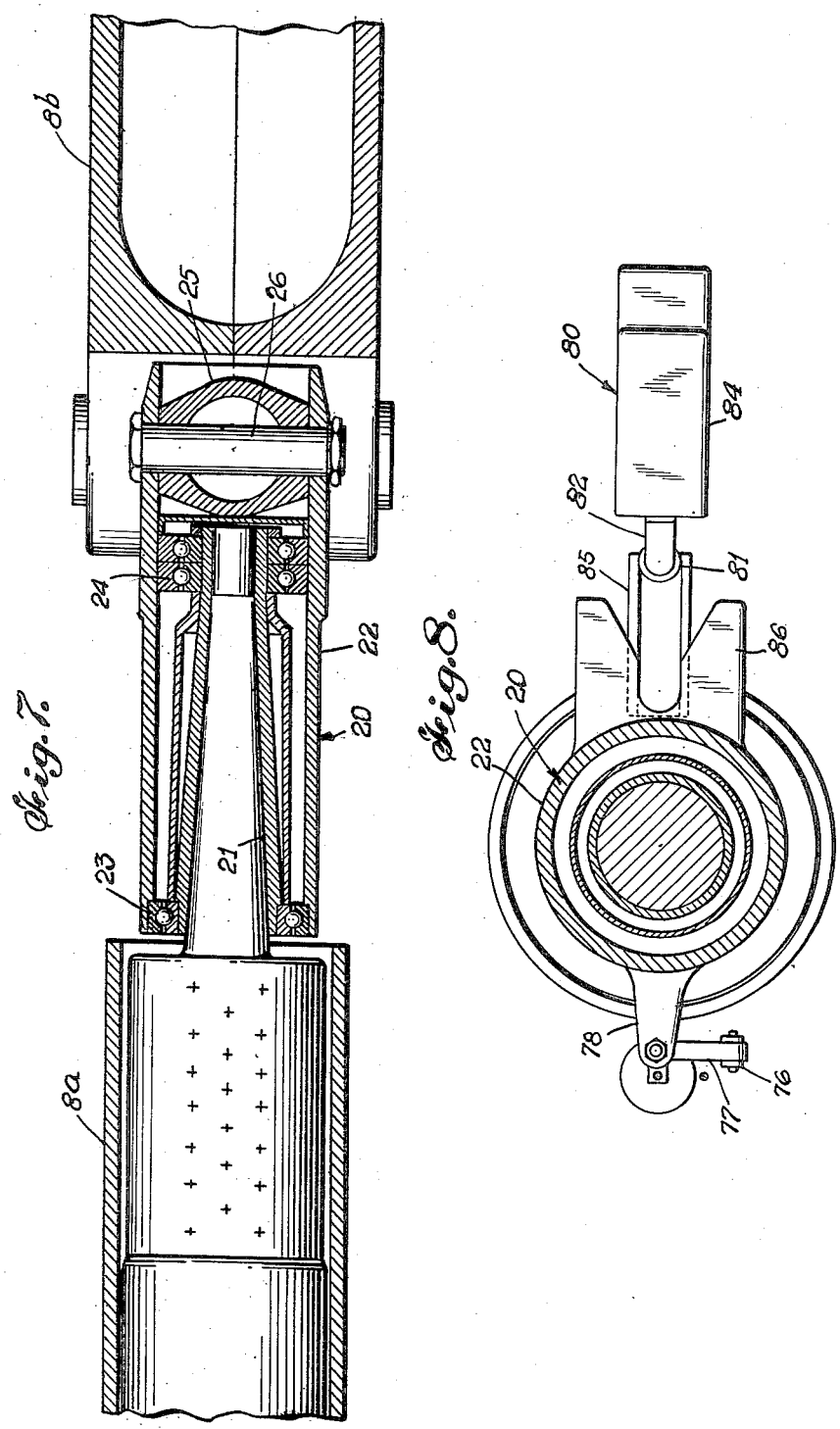

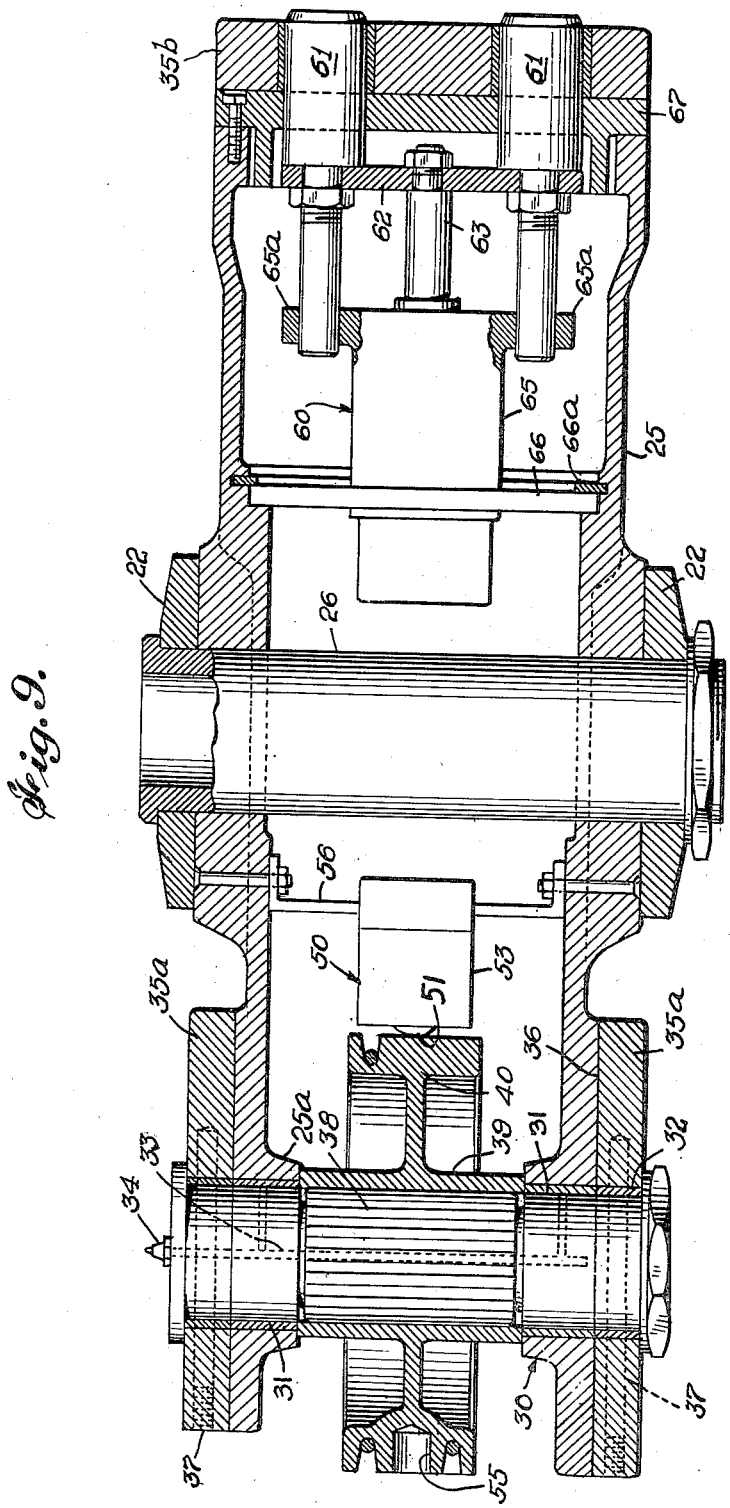

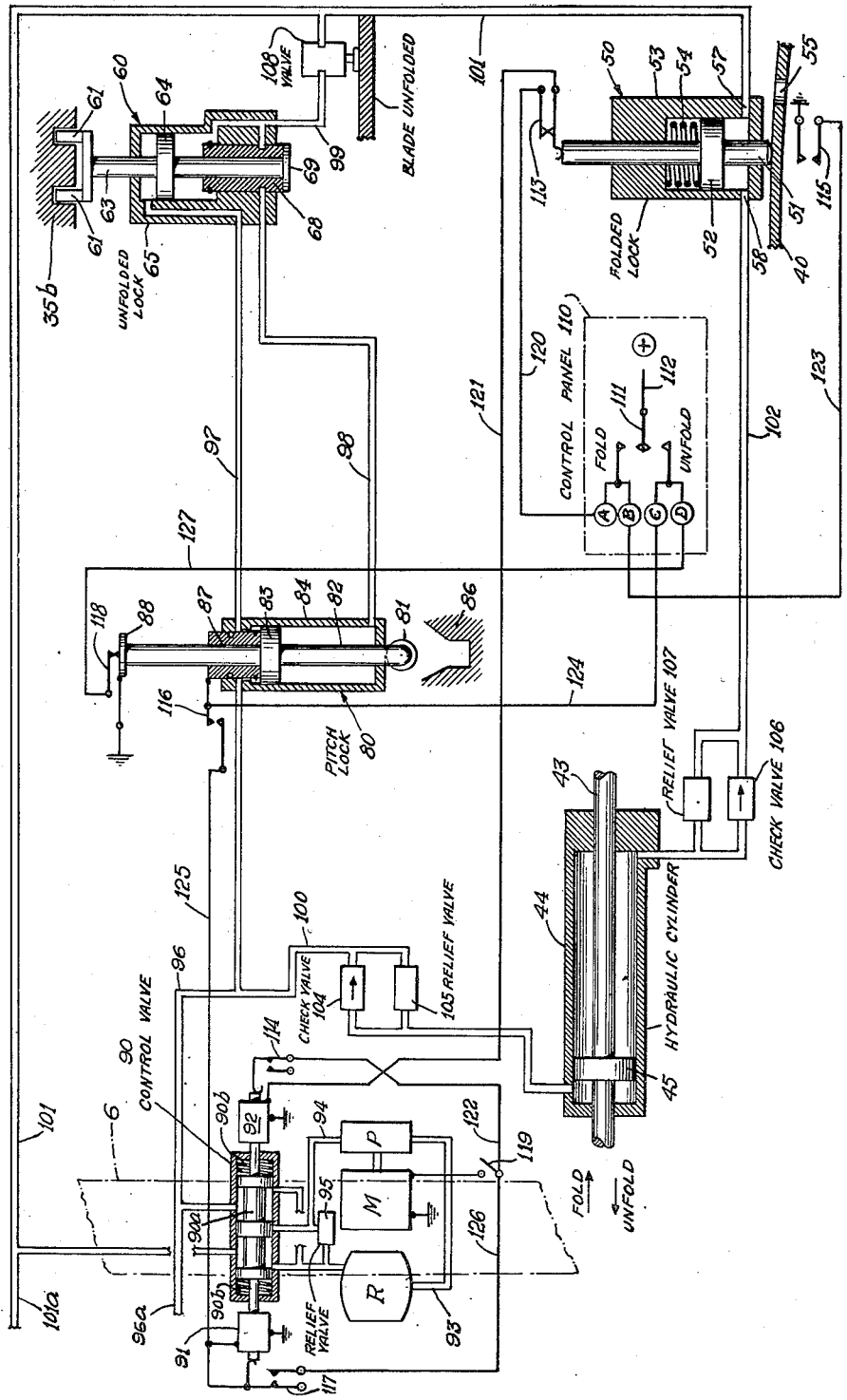

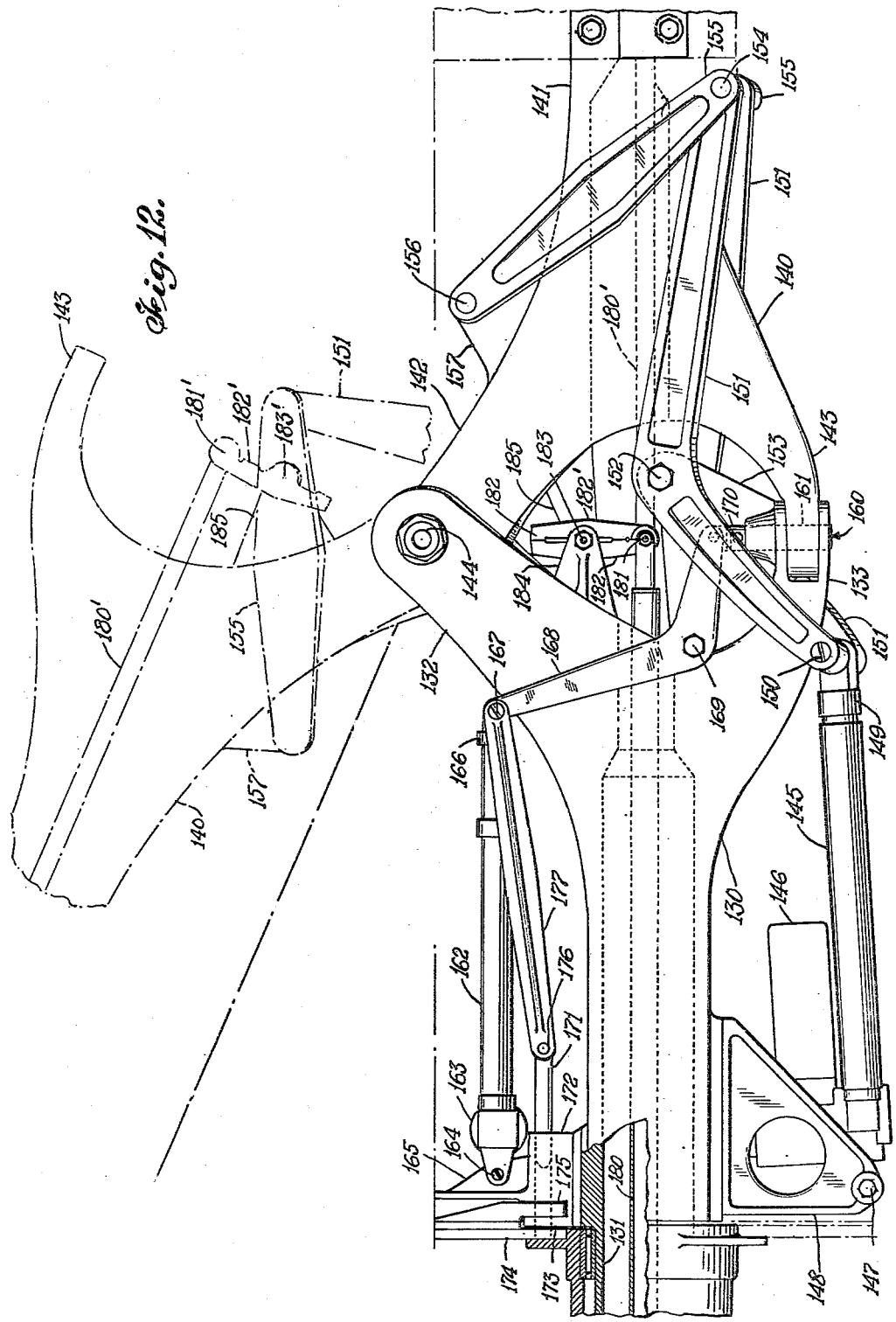

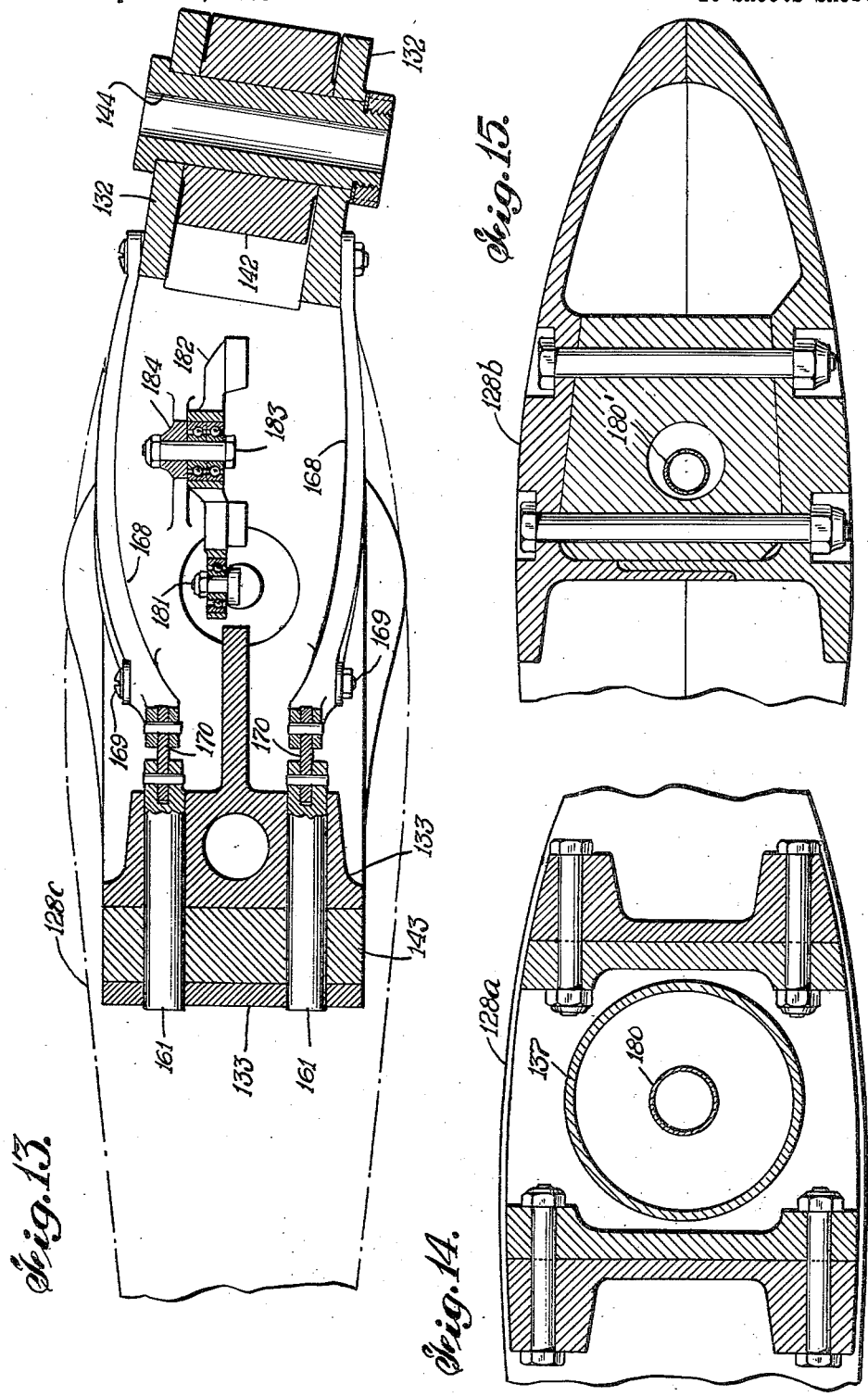

United States Patent Office 2,815,820
Patented Dec. 10, 1957

2,815,820

POWER FOLDING ROTOR BLADE SYSTEM FOR ROTARY WING AIRCRAFT

Peter J. Papadakos, St. James, N. Y., assignor to Gyrodyne Company of America, Inc., St. James, N. Y., a corporation of New York Application April 19, 1955, Serial No. 502,382

17 Claims. (Cl. 170—160.12)

The present invention relates to a power folding rotor blade system for rotary wing aircraft, herein referred to generically as "helicopters."

When helicopters are to be stored in a restricted area, for example on an aircraft carrier or other vessel or in a hangar, it is highly desirable for the rotor blades to be foldable in order to conserve space. Folding of the rotor blades is also desirable from the point of view of safety since it makes the helicopter less susceptible to damage by wind—and particularly gusts—when it is parked. While applicable to helicopters of any size, folding of the rotor blades is especially desirable in larger helicopters, for example those having rotor diameters of more than 50 feet.

However, the folding of helicopter rotor blades presents many problems. When the helicopter is on the ground, the rotor blades are subject to bending moment because of their own weight. In flight, the bending moment is reversed and increased since the rotor blades must carry the weight of the helicopter. The blades are also subjected to aerodynamic forces having lift and drag components and to high centrifugal forces arising from the rapid rotation of the rotor. The rotor blades must be mounted so as to be rotatable about their longitudinal axes in order to vary their pitch and, in most rotor systems currently used, the rotor blades also have limited flapping or see-saw movement in a vertical direction. The forces acting on the rotor blades vary cyclically when the helicopter is in motion since the air speed of the advancing blades is greater than that of the retreating blades. The pitch of the blades is also customarily varied cyclically in synchronism with the rotation of the rotor. All of these factors make it difficult to provide rotor blades that will fold and yet meet all the requirements of rotor blade design. A primary requirement is that the provisions for folding of the blades must not in any way impair the safety of the helicopter in its operation. Moreover, in order for rotor blade folding to be practical, especially in larger helicopters, it must be effected by power rather than manually.

It is an object of the present invention to provide power folding helicopter rotor blades in which the folding mechanism is of simple and compact construction, light in weight and entirely dependable. The folding of the rotor blades in accordance with the invention does not weaken the blades or intefere with the functioning of the rotors, including cyclical or non-cyclical pitch changes and flapping or see-saw action of the rotor blades.

A further feature of the rotor blade folding system in accordance with the invention is that means is provided for positively locking the blades both in folded and in unfolded position. The unlocking, folding or unfolding and relocking of the blades is effected automatically in predetermined sequence upon initiation of the folding or unfolding operation by the pilot. In conjunction with the automatic control system for the folding mechanism, there is provided visual or other signal means clearly indicating to the pilot the position of the rotor blades and further indicating the state of operation of the system, e. g. whether the blades are in the process of folding or unfolding.

A further feature of the invention is that locking means is provided for holding the rotor blades at a predetermined pitch when the blades are to be folded. The pitch locking means is tied in with the control system so that the rotor blades can be folded only when the pitch has been locked. In a preferred form of the invention, provision is also made for locking the rotor blades against flapping or see-saw movement in a vertical direction and permitting the folding of the blades only when such locking means is effective.

It is thus a purpose of the present invention to provide rotary wing aircraft with folding blades which are practical and economical and in which primary attention is given to safety in construction and operation of the aircraft.

The nature, objects and advantages of the invention will appear more fully from the following description and claims in conjunction with the accompanying drawings, in which:

Fig. 1 is a perspective view of a helicopter having power folding rotor blades in accordance with the invention;

Fig. 2 is an elevation on a larger scale of a portion of the rotor head of the helicopter shown in Fig. 1;

Fig. 3 is a plan of one of the rotors shown in folded condition;

Fig. 4 is an enlarged fragmentary vertical section taken approximately on the line 4—4 in Fig. 3;

Fig. 5 is a fragmentary plan showing the folding structure and mechanism of one of the rotor blades;

Fig. 6 is a vertical view taken approximately on the line 6—6 in Fig. 5 and showing schematically the power folding mechanism;

Fig. 7 is a vertical sectcion taken longitudinally of the rotor blade, approximately on the line 7—7 in Fig. 5 and on a larger scale;

Fig. 8 is a cross section taken approximately on the line 8—8 in Fig. 5 but on a larger scale and showing pitch locking mechanism;

Fig. 9 is an enlarged section taken on the line 9—9 in Fig. 5 and showing details of the hinged mounting of the rotor blade and locking means for holding the rotor blade in folded and unfolded positions;

Fig. 10 is a hydraulic and electric circuit diagram showing the operating control and safety circuits of the rotor blade folding system;

Fig. 12 is an enlargement of a central portion of Fig. 11; and

Figure 11:
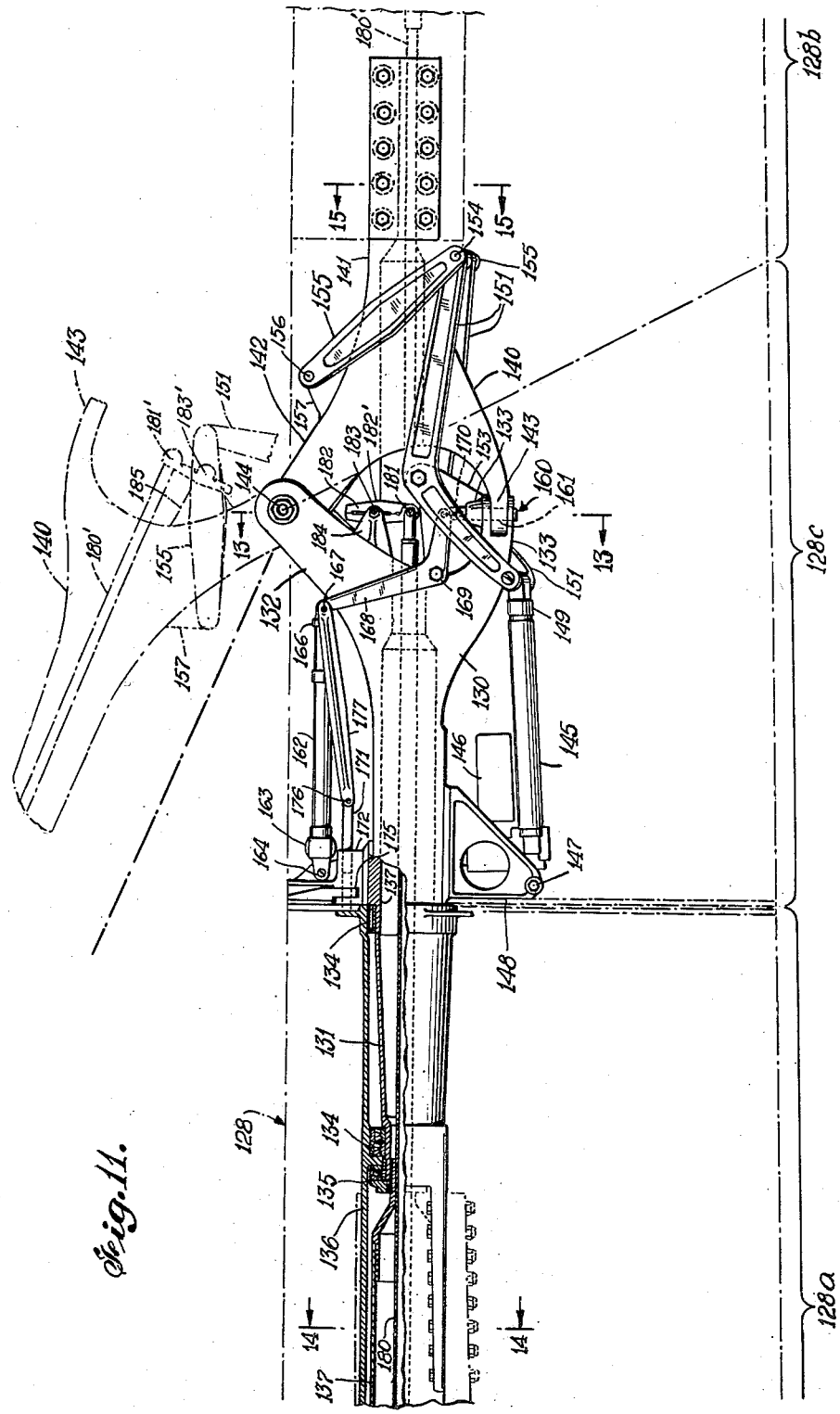
Fig. 11 is a fragmentary plan showing the folding structure and mechanism of a rotor blade in accordance with a second embodiment, certain portions being shown in horizontal section.

Figs. 13, 14 and 15 are enlarged cross sections taken approximately on the lines 13—13, 14—14, and 15—15, respectively, in Fig. 11.

The present invention is applicable to helicopters without restriction as to the particular rotor configuration used. Thus, the helicopter may have a single load-carrying rotor or a plurality of rotors arranged in tandem, side by side, or coaxially. The helicopter shown by way of example in Fig. 1 is of the coaxial type, having a fuselage 1 and a rotor system 2 comprising an upper rotor 3 mounted on an upper rotor shaft 4 and a lower rotor 5 mounted on a lower rotor shaft 6 (Fig. 2), the upper and lower rotor shafts being coaxial and rotated in opposite directions. As the upper rotor 3 and lower rotor 5 are substantially identical except that they are reversed so as to turn in opposite directions, the structure and folding mechanism of the lower rotor only will be particularly described, it being understood that the upper rotor is essentially the same.

While the rotor may have any desired number of blades, a two-bladed rotor is shown in Fig. 1. Each of the rotor blades 8 is divided into an inboard section 8a and an outboard section 8b, the two sections being hingedly connected with one another. The ratio of the length of the outboard section to that of the inboard section of each blade is preferably in the range of 1 to 1 and 2 to 1. As shown in Figs. 1 and 3, the outboard section 8b of each rotor blade is approximately twice as long as the inboard section 8a. The inboard sections 8a of the two rotor blades of each rotor are shown integral with one another so that their combined length is approximately equal to that of each of the outboard sections 8b. Hence, when folded, as illustrated in Fig. 3, the rotor has a diameter approximately one-third that of the rotor when in unfolded or operative position, as shown in Fig. 1.

Provision is made for vertical or flapping movement of the rotor blades relative to the rotor shaft or mast. The rotors are shown as being of the semi-rigid or see-saw type. Thus, the lower rotor 5 is connected to its shaft 6 by see-saw hinge pins 9 (Fig. 2), the upper rotor being similarly mounted on its shaft. A gust lock 10 is provided for holding the rotor blades approximately perpendicular to the mast when the rotor is stationary or rotating at low speed. The gust lock is shown as a pin 11 fixed on the inner end of a rod 12 slidably guided by a plurality of brackets 13 for movement longitudinally of the rotor blade. When the rotor is turning at normal speed, centrifugal force acting on the pin 11, rod 12 and a weight 14 fixed on the rod holds the pin 11 in an outer inoperative position. When the rotor is turning at low speed or is stopped, a spring 15 moves the pin 11 inwardly into engagement with a socket 16 on the mast, thereby locking the rotor against see-saw movement.

Provision is made for turning the rotor blades about their respective longitudinal axes to vary the pitch of the blades both cyclically and non-cyclically. The pitch of the entire blade may, if desired, be varied in conventional manner. However, in the embodiment shown, the inboard sections of the rotor blades are of fixed pitch, the pitch of the outboard blade sections only being varied during operation of the helicopter. As the inboard section of each blade constitutes only a third of the length of the blade and has relatively low rotational air speed, it has been found satisfactory to set the inboard blade sections at a selected pitch and leave them at that pitch during flight.

The outboard sections 8b of the rotor blades are mounted on the inboard sections 8a in such manner as to provide for folding the rotor. In the illustrated embodiment, the mounting also provides for turning the outboard sections 8b about their longitudinal axes to vary the pitch of said sections. The mounting is shown (Figs. 5 and 7) as comprising an inboard fitting 20 rotatably supported on a tapered spindle 21 provided on the outer end of the inboard section 8a, with its axis coinciding approximately with the longitudinal neutral axis of the rotor blade located approximately midway between the upper and lower surfaces of the blade and one quarter of the chordal distance between the leading edge 18 and the trailing edge 19. The inboard fitting 20 comprises a sleeve or grip 22 which is rotatably mounted on the spindle by anti-friction bearings 23 and 24 capable of taking both radial and thrust loads. The outer end portion of the sleeve 22 is bifurcated to receive a torque arm 25 (Figs. 5, 7 and 9) which is secured by a large hollow bolt 26 passing through aligned holes in the torque arm and bifurcated portion of the sleeve. The torque arm 25 is held approximately perpendicular to the sleeve 22 by a drag link 27 connected at one end to a bracket 28 on the torque arm and, at the other end, to a bracket 29 on the inner end portion of the sleeve 22. The drag link 27 is of adjustable length and means is provided for locking the adjustment. This adjustment makes it possible to line up the outboard section of the blade accurately with the inboard section.

The outboard section 8b of the blade is hingedly mounted on the forward end of the torque arm 25 so as to swing about a hinge axis approximately at the leading edge of the blade and perpendicular to the chord plane. The hinge mounting 30 is shown as comprising a hinge pin 31 rotatably supported by apertured and locally reinforced portions 25a of the torque arm 25. Bushings 32 are provided between the hinge pin 31 and the bearing surfaces of the torque arm. Drilled passageways 33 and a lubricating fitting 34 provide means for lubricating the bearing surfaces between the torque arm 25 and the hinge pin 31. An outboard fitting 35 on the inner end of the outboard section of the rotor blade and forming a structural part thereof has a bifurcated forward portion 35a which straddles the forward end portion of the torque arm 25 and has aligned holes through which the hinge pin 31 extends. The torque arm 25 and bifurcated portion 35a of the fitting 35 have interengaging bearing surfaces 36 which, together with the hinge pin 31, provide a strong hinge mounting for the outboard section of the rotor blade.

Power means is provided for swinging the outboard section 8b of the rotor blade about the hinge axis defined by the hinge pin 31 to effect the folding and unfolding of the blade. Threaded lock pins 37 extending through diametrical holes in the hinge pin 31 and into aligned holes in the portions 35a of the fitting 35 lock the fitting rotationally to the hinge pin. The central portion of the hinge pin is serrated or splined, as indicated at 38, to receive a correspondingly serrated or splined hub portion 39 of a drum 40 which is thereby locked rotationally to the hinge pin. A cable 41 is wrapped around the periphery of the drum 40 and is fixed to the drum by a clamp 42 so that it cannot slip (Fig. 5). The ends of the cable 41 are attached respectively to the opposite ends of a piston rod 43 which extends axially through a cylinder 44 which is fixedly mounted inside the inboard section 8a of the blade. A piston 45 is reciprocable in the cylinder 44 and fixed to the piston rod 43 so as to move it in an axial direction. As will appear from the description of the hydraulic circuit below, means is provided for supplying hydraulic fluid to opposite ends of the cylinder 44 to move the piston. One run of the cable 41 goes directly to the piston rod 43 while the other is guided by a pulley 46 rotatably mounted on the torque arm 25 and a pulley 47 rotatably mounted in the inboard section of the blade so that reciprocatory movement of the piston 45 produces rotary movement of the drum 40 and thereby swings the outboard section of the blade about its hinge axis. While the power unit for swinging the outboard section of the blade has been shown as a hydraulic motor in the form of a piston and cylinder, it will be understood that other suitable power means may be employed. For example, the hydraulic motor may be replaced by an electric motor.

Means is provided for locking the outboard section of the blade both in folded position (Fig. 3) and in unfolded or open position (Figs. 1 and 5). The blade is releasably locked in folded position by locking means 50 (Fig. 9) which is shown as a reciprocable locking pin 51 actuated by a piston 52 (Fig. 10) in a hydraulic cylinder 53. A spring 54 presses the pin 51 inwardly against the periphery of the drum 40, the pin being disposed radially to the drum. When the blade is in folded position, a hole 55 in the drum 40 is aligned with the pin 51 which enters the hole by action of the spring 54 and thereby locks the blade in folded position. The cylinder 53 is fixedly mounted inside the torque arm 25, for example by brackets 56 (Fig. 9). The cylinder 53 has ports 57 and 58 (Fig. 10) for connection to the hydraulic circuit described below.

Hydraulic fluid is supplied to the cylinder to move the pin 51 outwardly and thereby disengage it from the hole 55 in the drum 40 to release the outboard section of the blade for movement to open position.

Locking means 60 (Figs. 9 and 10) for locking the blade in open position comprises two pins 61 carried by a cross head 62 fixed on the end of a piston rod 63 of a piston 64 reciprocable in a cylinder 65. The cylinder is mounted inside the rear portion of the torque arm 25 by means of a base plate 66 and snap ring 66a. Enlarged outer end portions of the pins 61 extend through holes in a guide plate 67 which closes the rear end of the torque arm 25. When the blade is in open position, a rearward portion 35b of the fitting 35 lies immediately behind, and in engagement with, the guide plate 67 on the rear end of the torque arm and has holes into which the pins 61 project, thereby locking the fitting 35, and hence the outboard section of the blade, in open position. The inner ends of the pins 61 are guided by apertured ears 65a on diametrically opposite sides of the cylinder 65. The cylinder 65 is connected with a hydraulic control circuit as described below which supplies fluid under pressure for moving the piston 64 outwardly or inwardly so as to lock or unlock the blade. Moreover, certain functions of the circuit are controlled by an axially reciprocal sleeve-shaped shuttle valve 68 which surrounds the inner end of the piston rod 63 and is engageable by a collar 69 on the end of the piston rod.

The pitch of the outboard section of the rotor blade is variable by rotation of the inboard fitting 20, comprising the torque arm 25 and the sleeve 22 on the spindle 21 (Fig. 7). Means for varying the pitch both cyclically and non-cyclically comprises a swash plate 70 (Fig. 2) which surrounds the rotor shafts below the lower rotor and is mounted so that it can be moved vertically and also tilted in any direction. The swash plate 70 comprises an inner non-rotating portion and an outer rotating portion. The position of the swash plate is controlled by three screw jacks 71 which are connected by suitable linkage to the non-rotating part of the swash plate in such manner that, by the coordinated action of the screw jacks, the swash plate can be moved bodily in a vertical direction and also tilted in any direction. The screw jacks are controlled through suitable connections 72 from control members in the fuselage in known manner. The outer portion of the swash plate 70 rotates with the lower rotor and is connected, through a link 73, bell crank 74, rod 75, bell crank 76 and link 77, with an arm 78 (Fig. 8) projecting forwardly from the sleeve 22. Thus, upward and downward movement— either cyclical or non-cyclical—of the point of the swash plate to which the link 73 is connected produces rotary movement of the sleeve 22 and hence variation of pitch of the blade section carried by this sleeve. The other blade of the lower rotor is controlled in like manner from a diametrically opposite point on the swash plate. The outer rotating ring of the swash plate 70 is also connected by four tie rods 79 with a swash plate 70a (Fig. 2) which controls the pitch of the upper rotor blades in like manner.

Means is provided for locking the sleeve 22 against rotary movement and thereby locking the outboard blade section in predetermined pitch position when the blade is folded and during folding and unfolding operations. The pitch lock 80 (Figs. 5, 8 and 10) comprises a roller 81 carried by the piston rod 82 of a piston 83 reciprocable in a cylinder 84 fixedly mounted on the outer end of the inboard blade section 8a. The roller 81 is guided by a track 85 and adapted to engage in a fork 86 projecting rearwardly from the sleeve 22. Connections with the hydraulic system described below provide pressure fluid to the cylinder 84 for moving the piston 83 alternatively in either direction to lock or unlock the sleeve 22. The hydraulic system also includes a shuttle valve member 87 surrounding the piston rod 82 at the rear end of the cylinder 84 and movable axially in one direction by fluid pressure and in the opposite direction by a collar 88 on the piston rod 82.

Suitable covers 89 (Fig. 1) may, if desired, be provided for shrouding the hinge joints of the blade. The covers 89 are slidable, removable, or can be otherwise manipulated to permit the folding of the blades.

An automatic control system assures the correct sequential operation of the hydraulic cylinder 44 for moving the outboard section of the blade, the lock 50 for holding the blade in folded position, the lock 60 for holding the blade in open position and the pitch lock 80 in both the folding and unfolding operations. It is necessary only for the pilot to initiate the operation, whereupon it is carried through automatically in correct sequence. Moreover, signal means is provided to indicate that a folding or unfolding operation is in process and also indicate when it is completed. The control and signal system illustrated schematically in Fig. 10 is in part hydraulic and in part electric.

The hydraulic system comprises a master control valve 90 having an axially movable valve member 90a and springs 90b which normally hold the valve member in centered position. The valve member 90a is movable toward the right by an electromagnet 91 and is movable toward the left by an electromagnet 92. A pump P driven by an electric motor M receives hydraulic fluid from a reservoir R through a conduit 93 and delivers it to the control valve 90 through a conduit 94. Pressure is controlled by a relief valve 95 which by-passes the fluid back to the reservoir R when a predetermined pressure is exceeded. Connections between the control valve 90, the hydraulic cylinder 44 and lock means 50, 60 and 80 are provided by conduits 96 to 102 which are connected as clearly shown in Fig. 10. The elements shown are for one blade only of the lower rotor. However, the control valve 90 also controls the simultaneous folding and unfolding of the other blade of the lower rotor through connections 96a and 101a corresponding to connections 96 and 101, it being understood that the control circuit is symmetrical. The line 100 contains a check valve 106 and relief valve 107. The relief valves 105 and 107 are set to permit the flow of fluid at a predetermined pressure lower than that for which the relief valve 95 is set. Line 99 contains a valve 108 which is actuated by the outboard section of the rotor blade to open the valve when the blade is in unfolded or open position.

The electrical system comprises a control panel 110 accessible to the pilot. On the panel 110, there are mounted four signal lights designated A, B, C and D, respectively, and a double-throw switch 111 connected by a lead 112 to one pole of a suitable current source, the other pole of the source being grounded. The electrical circuit also contains switches 113 to 119 the connection and actuation of which will be clear from Fig. 10 and from the following description of the operation. The several elements of the electrical circuit are connected by wires 120 to 127, as shown, the term "wire" being used generically to include any suitable conductor.

The panel 110 controls the folding and unfolding of the rotor blades of the lower rotor, a like panel and similar circuit being provided for the other rotor in a two-rotor helicopter. To avoid complicating the drawing, a complete circuit is shown for one blade only of the lower rotor. The other rotor blade will have switches corresponding to switches 113, 115, 116 and 118, corresponding switches being connected in series with each other.

To fold the blades of the lower rotor starting from the open position, the pilot moves the switch 111 upwardly to connect the lamps A and B to the supply 112. As the switch 115 is open, the lamp B does not light. However, current flows through lamp A, wire 120, switch 113—which is closed by the outer end of pin 51—and wire 121 to the electromagnet 92, the other lead of which is connected to ground. The lighting of lamp A indicates that the folding operation is in process. The energizing of the electromagnet 92 moves the valve member 90a to the left, thereby closing the switch 114 and supplying current to the motor through the wire 122 and switch 119 which is closed when the gust lock 10 is in locked position. With the valve in this position, pressure fluid from the pump is supplied through conduit 96 to the pitch lock 80 and moves the piston 83 downwardly as seen in Fig. 10 so that the roller 81 engages in the fork 86 and thereby locks the rotor blade in minimum pitch position. At the end of the stroke of piston 83, the collar 88 on the upper end of the piston rod 82 engages the shuttle valve 87 and moves it downwardly so as to open the valve and thereby supply pressure fluid through conduit 97 to the locking device 60 by which the blade is held in open position. The piston 64 is thereupon moved downwardly, as viewed in Fig. 10, to disengage the lock and thereby release the blade for folding. Up to this stage, the check valve 104 and relief valve 105 have prevented the supply of fluid to the cylinder 44. However, when the unlocking of the blade has been completed, pressure builds up to the point where it exceeds that for which the relief valve 105 is set and fluid is thereupon supplied through conduits 96 and 100 to the left hand end of the cylinder 44 so as to move the piston 45 toward the right and thereby swing the blade to folded position through the mechanism described above. Any fluid in the right hand end of cylinder 44 is exhausted through the check valve 106, conduits 102 and 101 and the control valve 90 back to the reservoir R. When the folding of the blade is completed, the pin 51 of the locking device 50 engages the hole 55 in drum 40, being moved into the hole by the spring 54. This movement of the pin 51 opens the switch 113, thereby deenergizing the magnet 92, shutting off the pump and turning out lamp A, and closes switch 115, thereby lighting the lamp B to indicate completion of the folding operation.

To unfold the blades—starting with them locked in folded position—the pilot moves the switch 111 downwardly to connect lamps C and D with the supply 112. As switch 118 is open—the pitch lock being in locked position—lamp D does not light. However, current flows through lamp C, wire 124, switch 116 and wire 125 to the electromagnet 91 with return through ground. Upon being energized, the electromagnet 91 moves the valve member 90a toward the right, thereby closing switch 117 and supplying current to the motor through wire 126 and gust lock switch 119, which is closed. With the valve in this position, pressure fluid from the pump is supplied through the control valve 90 and conduit 101 to the locking device 50 and thereby moves the piston 52 upwardly, as viewed in Fig. 10, to withdraw the pin 51 from the hole 55 and thereby unlock the drum 40 so that the blade is free to swing toward open position. When the piston 52 has reached the end of its movement, pressure in the system builds up to a value exceeding that for which the relief valve 107 is set and pressure fluid is thereupon supplied through conduits 101 and 102 to the right hand end of cylinder 44 so as to move the piston 45 toward the left and thereby swing the blade toward open position. Any fluid in the left hand end of the cylinder 44 is exhausted through the check valve 104, conduits 100 and 96 and control valve 90 back to the reservoir. When the unfolding of the blade is completed, a portion of the blade engages the valve 103 to open the valve and thereby supply fluid pressure through the conduit 99 to the locking device 60. The piston 64 is thereby moved upwardly, as viewed in Fig. 10, causing the pins 61 to engage in the aligned holes of the rearward portion 35b of the fitting 35 to lock the blade in open position. As the piston 64 completes its upward stroke, the collar 69 on the end of piston rod 63 engages the shuttle valve 68 and thereby opens the valve so as to supply pressure fluid through the conduit 98 to the pitch lock device 80. The piston 83 is thereby moved upwardly, as viewed in Fig. 10, to withdraw the roller 81 from the fork 86 and thereby free the blade for pitch variation. As the piston 83 completes its stroke, it opens switch 116 and closes switch 118. The opening of switch 116 turns off lamp C, deenergizes electromagnet 91 and stops the motor. The closing of switch 118 permits the flow of current through lamp B, wire 127 and switch 118 to ground, thereby lighting the lamp D to indicate completion of the unfolding operation.

A second embodiment of rotor blade folding mechanism in accordance with the invention is shown in Figs 11 to 15. The mechanism illustrated in these figures is particularly applicable to four-bladed rotor systems in which an outboard section of each rotor blade is folded so as to swing under—or over—the inboard section of an adjacent blade.

As illustrated in Fig. 11, a rotor blade 128 comprises an inboard section 128a, an outboard section 128b hingedly connected to the inboard section and a short intermediate section 128c. The inboard section 128a constitutes about 30% to 50% of the blade, depending on the desired folded configuration. With a four-bladed rotor system, the inboard section is preferably about 40% of the blade length.

The hinged mounting of the outboard section 128b of the rotor blade is provided by an inboard fitting 130 and an outboard fitting 140. The inboard fitting 130 is generally T-shaped, comprising a spindle portion 131, a forwardly projecting portion 132 and a rearward portion 133. The spindle 131 is rotatably supported by radial bearings 134 and a thrust bearing 135 in a sleeve 136 fixed in the outer end portion of the inboard blade section 128a. The rotatable mounting of the inboard fitting 130 provides for pitch variation of the outboard section 128b and intermediate section 128c of the blade, the pitch being controlled by means of a pitch torque tube 137 having a reduced end portion that is splined to the spindle 131. At its inboard end, the torque tube 137 is provided with a suitable arm (not shown) connected to pitch control mechanism, for example to a swash plate like the swash plate 70 illustrated in Fig. 2.

The outboard fitting 140 is also generally T-shaped, having a shank portion 141 fixed to the structure of the outboard blade section 128b, a forwardly projecting portion 142 and a rearwardly projecting portion 143. The forwardly projecting portion 132 of the inboard fitting is bifurcated to receive the forward portion 142 of the outboard fitting and a hinge pin 144 passes through aligned holes in the portions 132 and 142 to provide a hinge connection between the two fittings 130 and 140. The axis of the hinge pin 144 is located approximately at the leading edge of the blade and is slightly inclined with respect to the chord plane so that, when the blade is folded, the outboard section 128 swings downwardly and then up underneath the inboard section of the next blade of a four-bladed rotor system. The interleaved portions 132 and 142 of the two fittings are correspondingly inclined so as to be normal to the axis of the hinge pin 144. The rearward portion 133 of the inboard fitting is also bifurcated—but in a plane approximately normal to the chord plane—to receive the rearward portion 143 of the outboard fitting when the blade is in unfolded position.

The outboard section of the blade is swung between folded and unfolded positions by means of an actuator 145 which is shown in the form of a screw jack unit driven by an electric motor 146. The actuator 145 is pivotally mounted at 147 on a bifurcated bracket 148 on the inboard fixture 130 and has a longitudinally movable actuator element 149 that is pivotally connected at 150 to one arm each of a pair of bell crank levers 151 which are pivotally mounted at 152 on a web-like bracket 153 on the inboard fitting 130. The other arms of the bell cranks 151 are pivotally connected at 154 to a pair of links 155 the other ends of which are pivotally connected at 156 to a bracket 157 on the outboard fitting 140. Starting with the mechanism in the unfolded position shown in solid lines in Fig. 12, longitudinal movement of the actuator element 149 toward the right acts through the bell cranks 151 and links 155 to swing the outboard fitting 140 about its hinge pin 144 to the folded position shown in broken lines.

Means is provided for securing the outboard section of the blade in both unfolded and folded positions. A locking device 160 for holding the outboard section of the blade in unfolded position comprises two pins 161 (Fig. 13) extending through aligned holes in the interleaved rearward portions 133 and 143 of the fittings 130 and 140. The pins 161 are retractable by an actuator 162 shown in the form of a screw jack driven by an electric motor 163. The actuator is pivotally mounted at 164 on a bracket 165 on the fitting 130. A longitudinally movable element 166 of the actuator 162 is pivotally connected at 167 to one arm each of a pair of bell cranks 168 pivoted at 169 on the fitting 130. The other arms of the bell cranks 168 are connected by links 170 to the locking pins 161. Movement of the actuator element 166 toward the left as viewed in Fig. 12 rocks the bell crank 168 in a counterclockwise direction and thereby withdraws the pins 161 to release the outboard blade section for folding. In folded position, the outboard blade section comes up underneath the inboard section of the adjacent blade and is held in place by a suitable latch (not shown).

A pitch lock is also provided for securing the inboard fitting 130 against rotational movement when the blade is folded or is being folded or unfolded. A pitch lock pin 171 is longitudinally slidable in aligned holes in portions 172 and 173 fixed to the inboard fitting 130 and interleaved portions 174 and 175 is fixed to the inboard section of the blade. The pin 171 is pivotally connected at 176 to a pair of links 177 connected at their opposite ends to the movable element 166 of the actuator 162 for the locking device 160. When the outboard blade section is locked in unfolded position, as shown in solid lines in Fig. 12, the pitch lock pin 171 is retracted so that the pitch of the outboard and intermediate sections of the blade is variable by means of the pitch torque tube 137 (Fig. 11). When the actuator 162 is energized to retract the locking pins 161, the pitch lock pin 171 is moved toward the left, as viewed in Fig. 12, so as to engage in the holes provided in fixed members 174 and 175. The holes for the locking pin 171 are brought into alignment by setting the pitch controls at minimum position. If this has not been done, the fixed portion 175 blocks the movement of the locking pin 171 and thereby blocks the withdrawal of the locking pins 161. The interconnections of the locking pins with the actuator element 166 are such that the pins 161 can be withdrawn to unlock the blade for folding only when the blade pitch is locked at minimum position.

It will be noted that, while the pitch of the intermediate section 128c of the rotor blade is variable with that of the outboard section 138b, the intermediate section does not fold but remains in the position shown in Fig. 11. Thus, the inboard section is of constant—although preferably adjustable—pitch, the intermediate section is of variable pitch but does not fold and the outboard section is of variable pitch and folds. This provides an aerodynamically clean structure while permitting pitch change and folding of the rotor blade.

To provide for the control of a tip brake or other controllable unit in the outboard blade section, a push-pull tube 180 extends longitudinally of the inboard section of the blade inside and coaxial with the torque tube 137 and out through the spindle portion 131 of the inboard fitting 130. The outer end of the push-pull tube 180 is pivotally connected at 181 to a lever 182 that is fulcrumed at 183 on a bracket 184 provided on the fitting 130. A mating lever 182' is pivoted at 183' on a bracket 185 on the outboard fitting 140. The lever 182' is pivotally connected at 181' to a push-pull tube 180' that extends longitudinally of the outboard blade section and is movable in a longitudinal direction. When the outboard blade section is in unfolded position, as shown in solid lines in Fig. 12, the pivotal axes of the mating levers 182 and 182' coincide, as do also the axes of the pivotal connections with tubes 180 and 180' respectively. The levers 182 and 182' interfit in such a way that they are obliged to rock together about their coinciding axes. Thus, both pushing and pulling movement imparted to one tube is transmitted to the other. A positive connection between the two tube sections is thus provided without interfering with the folding of the the blade.

In order to save weight and simplify the blade folding provisions, an external electrical power source is used for blade-folding. Each rotator is provided with an external power receptacle and with folding controls that are manipulated by the ground crew. Interlocking relays and switches are provided to establish the correct sequence of operation during the folding and unfolding of the blades, as described above in connection with the embodiment of Figs. 1 to 10. The blade-folding operation is as follows: The cyclic pitch control stick and rudder pedals are locked in neutral position and the collective pitch stick is locked at minimum pitch. The external power source is plugged into the receptacle provided on the rotor and a ground operator actuates a three-position switch to the "fold" position. Electrical power is thereby provided to the motor 163 of the actuator 162 (Fig. 12), thereby energizing the actuator to move the pitch lock pin 171 into locked position and simultaneously retract the fold lock pins 161 to permit the folding of the blades. Upon completion of this operation, the pitch and fold lock actuator 162 strips a switch which permits flow of current to the folding actuator 145, thereby folding the blades of the rotor to the position shown in broken lines in Fig. 12. When the blades are completely folded, latch mechanism on the lower sides of the inboard blade sections is tripped to secure the folded outboard blade sections in folded position.

The sequence of operation for extending the blades is as follows: With external power plugged into the external power receptacle of the rotor, the operator moves the control switch to "extend" position. Electrically actuated releasing means thereupon unlocks the blade supporting latch mechanism. When the latch mechanism is fully released, it trips a switch to supply current to the fold actuator 145 to operate the actuator in a direction to unfold the blade. When the blade is in fully extended position, it trips a switch energizing the pitch and fold lock actuator 162. The movable element 166 of the actuator is thereupon moved toward the right (Fig. 12) to move the fold lock pins 161 into locking position and simultaneously retract the pitch lock pin 171. As the circuits and controls for folding and locking the blades will be apparent to those skilled in the art from the foregoing description and by analogy with the embodiment illustrated in Fig. 10, further description and illustration is believed unnecessary.

While preferred embodiments of the invention have been shown and particularly described, it will be understood that the invention is in no way limited to these embodiments. Insofar as they are not incompatible, the various features of the two embodiments shown and described are mutually interchangeable. Still other modifications will be apparent to those skilled in the art.

I claim:

1. In a helicopter, a rotor blade comprising an inboard section and an outboard section, means rotatably and hingedly connecting the inner end of said outboard section to the outer end of said inboard section for rotary movement of said outboard section relative to said inboard section about an axis extending longitudinally of said inboard section and for swinging movement of said outboard section relative to said inboard section about a hinge axis approximately prependicular to the chord plane of the blade and located near the leading edge of the blade, means for turning said outboard section relative to said inboard section to vary the pitch of said outboard section, power means for swinging said outboard section about said hinge axis between a position in which it is substantially in line with the inboard section and a position in which it is folded so as to extend inwardly from the outer end of the inboard section and means for locking said outboard section in said positions.

2. In a helicopter, a rotor shaft, a rotor blade comprising an inboard section and an outboard section, means connecting the inner end of the inboard section to said shaft, a first fitting rotatably mounted on the outer end of the inboard section to turn about an axis extending longitudinally of said inboard section, a hinge pin carried by said fitting, said hinge pin being located at the leading edge of the blade and having its axis approximately vertical, a second fitting fixed on the inner end of the outboard section and embracing said hinge pin to provide a hinge connection between said outboard and inboard sections, power means for swinging said outboard section about said hinge pin axis between an extended position in which it is substantially in line with the inboard section and a position in which it is folded so as to extend inwardly from the outer end of the inboard section, means for locking said outboard section in said positions and means for turning said outboard section about said longitudinally extending axis when said outboard section is in extended position to vary the pitch of said outboard section.

3. In a helicopter, a rotor blade comprising an inboard section and a separate outboard section, a first fitting mounted on the outer end of the inboard section and extending chordwise thereof, said fitting providing vertically spaced coaxial bearing portions located at the leading edge of the blade and having their axis approximately perpendicular, a hinge pin rotatably supported in and by said bearing portions, a second fitting fixed on the inner end of said outboard section and having bearing portions embracing said hinge pin to provide a hinge connection between said outboard and inboard sections, at least one bearing portion of one of said fittings being disposed between the bearing portions of the other of said fittings so that adjacent ends of said inboard and outboard sections are at the same level, said second fitting being fixed to the hinge pin to rotate therewith, a drum fixed to said hinge pin, a cable wrapped around said drum, power means acting on said cable to rotate said drum and thereby swing said outboard section between a position in which it is substantially in line with said inboard section with adjacent ends of said sections of the same level and a position in which it is folded so as to extend inwardly from the outer end of said inboard section and means on one of said fittings engaging cooperating means on the other of said fittings to lock said sections relative to one another.

4. A helicopter rotor blade according to claim 3, in which a latch on said first fitting engages a cooperating abutment surface on said drum to hold said outboard section in folded position.

5. In a helicopter, a rotor shaft, a rotor blade comprising an inboard section and an outboard section, means mounting the inboard section on said shaft at a predetermined pitch, a spindle mounted at the outer end of the inboard section and projecting longitudinally thereof, a first fitting having a sleeve portion rotatable on said spindle and a torque arm mounted on said sleeve and extending chordwise of the blade, a hinge pin carried by said torque arm, said hinge pin being located at the leading edge of the blade and having its axis approximately vertical, a second fitting fixed on the inner end of the outboard section and embracing said hinge pin to provide a hinge connection between said outboard and inboard sections, means for rotating said first fitting on said spindle to vary the pitch of said outboard section, power means for swinging said outboard section about said hinge pin axis between a position in which it is substantially in line with the inboard section and a position in which it is folded so as to extend inwardly from the outer end of the inboard section, means for locking said first fitting relative to said spindle to maintain said outboard section in predetermined fixed pitch relation to the inboard section, means coordinating said locking means and swinging means to cause the locking of said first fitting prior to the folding of said blade, and means for locking said second fitting relative to said first fitting to hold said outboard section in the position to which it has been swung.

6. In a helicopter, a rotor shaft, a rotor mounted on said shaft and having a plurality of rotor blades each comprising an inboard section and an outboard section, the inboard sections of said blades being structurally integral with one another, means connecting the inner end of the outboard section with the outer end of the inboard section of each blade to provide for swinging movement of said outboard section about an approximately vertical axis at the outer end of the inboard section and rotary movement about an approximately horizontal axis extending longitudinally of the blade to vary the pitch of said outboard section, means for releasably locking said outboard section against movement about said horizontal axis and power means for swinging said outboard section about said vertical axis between a position in which said outboard section is substantially in line with the inboard section of the same blade and a position in which the outboard section extends inwardly from the outer end of the inboard section and means coordinating said locking and swinging means to permit said outboard section to swing only when said locking means is in locking condition.

7. A helicopter according to claim 6, in which said swinging means comprises a hydraulic motor for swinging the outboard section of each blade and a common hydraulic and control system for all the blades of said rotor.

8. A helicopter according to claim 7, in which said locking means is hydraulically operated and is connected to and controlled by said hydraulic and control system.

9. In a helicopter, a rotor shaft, a rotor mounted on said shaft and having a plurality of rotor blades each comprising an inboard section and an outboard section, the inboard sections of said blades being structurally integral with one another, a spindle mounted at the outer end of the inboard section of each blade and projecting longitudinally thereof, a first fitting having a sleeve portion rotatable on said spindle and a torque arm fixed on said sleeve and extending chordwise of the blade, a hinge pin carried by said torque arm, said hinge pin being located at the leading edge of the blade and having its axis approximately vertical, a second fitting fixed on the inner end of the outboard section of each blade and embracing said hinge pin to provide a hinge connection between said outboard and inboard sections, means for rotating said first fitting on said spindle to vary the pitch of said outboard section, power means for swinging said outboard section about said hinge pin axis between a position in which it is substantially in line with the inboard section and a position in which it is folded so as to extend inwardly from the outer end of the inboard section, means for releasably locking said first fitting relative to said spindle to maintain said outboard section in predetermined fixed pitch relation to the inboard section, and means for releasably locking said second fitting relative to said first fitting to hold said outboard section in the position to which it has been swung relative to the inboard section.

10. In a helicopter, a rotor blade comprising an inboard section and an outboard section, a spindle mounted at the outer end of the inboard section and projecting longitudinally thereof, said spindle being disposed approximately one-fourth the chord from the leading edge of the blade, a first fitting comprising a sleeve rotatable on said spindle and a torque arm pivotally mounted on the outer end of said sleeve and extending approximately chordwise of the blade, a drag link adjustably connecting said torque arm and sleeve to maintain a selected angular relation between them, a hinge pin carried by said torque arm, said hinge pin being located at the leading edge of the blade and having its axis approximately vertical, a second fitting fixed on the inner end of the outboard section and embracing said hinge pin to provide a hinge connection between said outboard and inboard sections, means for rotating said first fitting on said spindle to vary the pitch of said outboard section, power means for swinging said outboard section about said hinge pin axis between a position in which it is substantially in line with the inboard section and a position in which it is folded inwardly, means for releasably locking said first fitting relative to said spindle to maintain said outboard section in predetermined pitch relation to the inboard section and means for releasably locking said second fitting relative to said first fitting to hold said outboard section in the position to which it has been swung about said hinge pin axis.

11. A helicopter blade according to claim 10, in which said power means is disposed in the inboard section of the blade.

12. In a helicopter, a rotor blade comprising an inboard section and an outboard section, means hingedly connecting the inner end of said outboard section to the outer end of said inboard section, said connecting means having a hinge axis approximately vertical and located at the leading edge of the blade, hydraulic means for swinging said outboard section about said hinge axis between an unfolded position in which it is substantially in line with the inboard section and a folded position in which it extends inwardly from the outer end of the inboard section, hydraulic latch means for releasably locking the outboard section in said unfolded position and a hydraulic and control system connected to said hydraulic means and actuating them in predetermined sequence.

13. A helicopter according to claim 12, in which said hydraulic means for swinging said outer section comprises a reversible hydraulic motor and in which said hydraulic and control system comprises means for operating said motor selectively in either direction.

14. In a helicopter, a variable pitch rotor blade comprising an inboard section and an outboard section, means for varying the pitch of the blade, means hingedly connecting the inner end of said outboard section to the outer end of said inboard section, said connecting means having a hinge axis approximately vertical and located at the leading edge of the blade, hydraulic means for releasably locking said blade in predetermined pitch position, hydraulic means for swinging said outboard section about said hinge axis between an unfolded position in which it is substantially in line with the inboard section and a folded position in which it extends inwardly from the outer end of the inboard section, hydraulic means for releasably locking the outboard section in said unfolded position and a coordinated hydraulic and control system connected to said hydraulic means and actuating them in predetermined sequence to lock said blade in predetermined pitch position, release said locking means holding said outboard section in unfolded position and swing said outboard section to folded position.

15. A helicopter according to claim 14, in which hydraulic means is provided for releasably locking said outboard section in folded position.

16. A helicopter according to claim 15, in which said hydraulic and control system comprises means for actuating all of said hydraulic means in predetermined sequence to release the locking means holding said outboard section in folded position, swinging said outboard section to folded position, lock said outboard section in unfolded position and release said pitch lock.

17. A helicopter according to claim 14, in which said hydraulic and control system comprises pilot-operable means for selectively initiating a sequence of operations to fold or unfold said blades.

References Cited in the file of this patent

UNITED STATES PATENTS

| | | |
|---|---|---|
| 2,464,285 | Andrews | Mar. 15, 1949 |
| 2,497,040 | Williams | Feb. 7, 1950 |